Dec. 31, 1935.　　　　F. LISINTZKI　　　　2,026,478
LIGHTING DEVICE FOR PROJECTING MACHINES
Filed Sept. 8, 1934
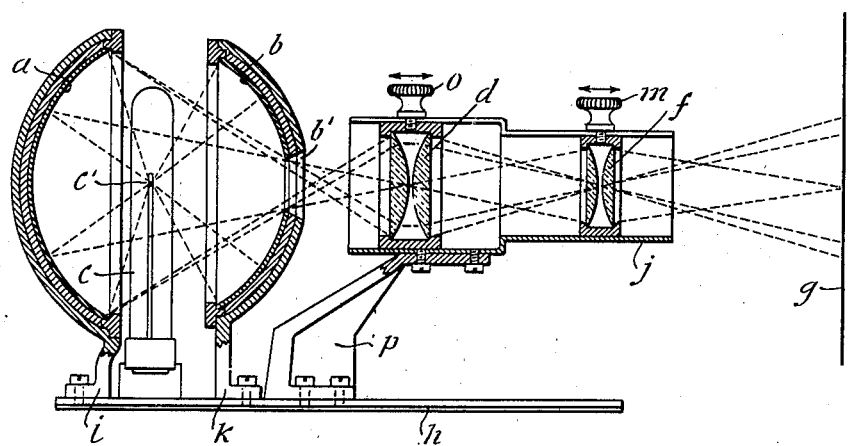
WITNESSES
INVENTOR
*Franz Lisintzki*
BY
ATTORNEY Patented Dec. 31, 1935

2,026,478

UNITED STATES PATENT OFFICE 2,026,478

LIGHTING DEVICE FOR PROJECTING MACHINES

Franz Lisintzki, Budapest, Hungary

Application September 8, 1934, Serial No. 743,272
In Germany March 5, 1934

1 Claim. (Cl. 88—24)

The present invention relates to a lighting device with reflector consisting of the combination of two mirrors and two condenser lens systems for projection machines of all kinds both for moving and for still pictures.

With the known lighting devices above mentioned only a small fraction of the light beam of the projection lamp can be utilized on account of the fact that a comparatively small solid angle only of the light emitting surface of the projection lamp can be gathered and also due to the necessity to illuminate the screen to a large degree beyond the limits of the actual picture in order to assure an even distribution of light within the confines of the projected picture.

The present invention proposes to eliminate the above indicated disadvantages in a simple manner.

According to this invention the desired result is obtained by enclosing the light emitting surface of the projection lamp between two concave mirrors which are facing each other. One of the said mirrors is provided with an aperture and reflects the light towards the other mirror, while the second mirror condenses the light and reflects it back through the said aperture in the first mirror.

By using a collecting mirror according to this invention practically the whole solid angle of the light emitting surface of the projection lamp is included so that the beam of light emitted by the projection lamp may escape through the aforesaid aperture almost without any loss and may thus be fully utilized. This has the advantage that even by using a comparatively weak and therefore harmless lamp a brightly illuminated picture area is obtained even in a semi-dark room so that the complete darkening of school rooms or lecture halls becomes unnecessary when showing projection pictures. Consequently all costly devices required for completely darkening a room may be dispensed with and the possibilities in the use of projection machines may be greatly increased.

In order to assume an evenly and fixedly steady illuminated picture without considerable spreading of light, the invention provides two relatively adjustable pairs of condenser lenses or lens systems placed between the aperture of the collecting mirror and the condenser of the projection machine in such a manner that by relatively adjusting to each other and to the aperture of the collecting mirror these two pairs of lenses or lens systems the whole light beam passing through the aperture of the collecting mirror may be brought within the necessary angle required by the condenser of the projection machine. Thereby the primary beam of light is utilized with the greatest efficiency which in turn results in saving of energy for the primary source of light.

The invention is illustrated in greater detail in the attached drawing which shows one modification of the invention in a diagrammatic longitudinal section.

In the drawing $c$ represents a projection lamp of any suitable construction while $c_1$ represents the filament of the lamp composed of a plurality of spiral loops. A conventional spherical reflector $a$ is represented in the drawing by a concave, either spherical or elliptical, mirror arranged outside of the lamp $c$ it being understood that such mirror may also be arranged within the lamp and on the lamp itself.

Said reflector $a$ gathers the light from the light emitting surface of the lamp from one half of the same almost in its totality and reflects it towards the plane $g$ where the conventional condenser of the projection machine may be arranged.

According to the invention there is another collecting mirror placed in front of the lamp $c$, the said collecting mirror $b$ being provided with a central aperture and representing another mirror surface outside of the lamp although also this mirror surface could be arranged within the lamp and on the lamp itself.

The mirror $b$ is formed and placed in such a manner that it reflects the primary light produced by the lamp $c$ towards the reflector $a$. Accordingly, the reflector $a$ has a double function: In the first place it includes almost the total solid angle of the light beam emanating from the filament of the lamp $c$ in the direction of the reflector $a$ and condenses and reflects this light beam through the aperture $b_1$ of the mirror $b$ towards the plane $g$, and in the second place the said mirror $a$ also reflects that beam of light which the mirror $b$ has gathered on the other side of the lamp $c$ in a solid angle approximately equal to the solid angle of the reflector $a$ so that this part of the total light beam, gathered by the mirror $b$, reaches the plane $g$ through the single aperture $b_1$ in the said mirror $b$.

The filament $c_1$ of the lamp $c$ is placed at the double focal distance of the mirror $b$ so that the light reflected by the mirror $b$ in the direction of the reflector $a$ produces an image of the filament besides the actual filament of the projection lamp, while the light reflected by the collecting mirror reaches the reflector in the same manner as the primary light received by the reflector from the filament of the projection lamp itself.

The aperture $b_1$ is of such dimension that the condensed light beam reflected by the reflector $a$ may pass through it. This light beam reaches the plane $g$ through two pairs of condenser lenses $d$ and $f$. The condenser $d$ projects the light beam leaving at $b_1$ upon the condenser $f$ which in turn produces at the plane $g$ an image of the condenser $d$ in an even distribution of light and under such solid angle that the said image may be gathered by the conventional condenser of the projection machine which is not shown in the drawing but which must be assumed in the plane $g$.

The pairs of condensers $d$ and $f$ are adjustable with reference to each other so that by a simple adjustment of their relative positions the area and intensity of the projection at the plane $g$ may be easily adjusted and within a wide range.

My lighting device for projection machines is characterized by the fact that it consists of a source of light ($c_1$) and of two concave mirrors ($a$, $b$) of wide opening one of which ($b$) is provided with an aperture ($b_1$) permitting light to pass through, and of two condenser lens systems ($d$, $f$) in such a manner that the source of light is located near the focal point of one mirror ($a$) and at the geometrical center of the other mirror ($b$), said last mentioned mirror being provided with the aperture ($b_1$), while the first surface of the first condenser lens system, near the mirror, is located between the images formed by the light rays reflected by the edges and the center of the mirrors near the narrowest portion of the cone of light rays where the distribution of light is naturally most uniform, whereas the second system of condenser lenses ($f$) is located between the first condenser lens system and the plane $g$, as illustrated in the drawing, in such adjustable relation to the same that the narrowest portion of the cone of light rays forms an optical objective plane and the surface $g$ forms a picture plane.

At episcopical projection the opaque object to be projected is in the plane $g$, whereas at diascopical projection the condenser lens system is in front of the plane $g$ and the transparent object, film or diapositive, is near the plane $g$. The size of the uniformly lighted surface in the plane $g$ and the distance of the plane $g$ is determined by the adjustable position of the second condenser lens system ($f$) in accordance with the projection machine which is being used.

The adjustability of the pairs of lenses $d$ and $f$ with reference to each other may be accomplished by any suitable means: according to the modification illustrated in the drawing the said pairs of lens systems are slidably mounted within a joint, slotted tube $j$ wherein they may be secured in position by means of the screws $o$ and $m$ respectively.

A lighting device according to this invention may be installed in existing projection machines in order to increase their illuminating power. To facilitate such installation it is advisable to comprise the socket for the lamp, the reflector $a$, the mirror $b$ and the pairs of lenses $d$ and $f$ in one unit so that they may be mounted as one unit in the projector. This may be done readily by securing the said elements by means of supports $i$, $k$ and $p$ upon a base board $h$.

What I claim is:

A lighting device for projecting machines, including front and rear concave mirrors spaced apart, the front mirror having a central aperture, a source of light located near the focal point of the rear mirror and at the geometrical center of the front mirror, two spaced lens systems in line with the aperture, the first surface of the first lens system nearest the aperture being located between the images formed by the light rays reflected by the edges and the center of the mirrors near the narrowest portion of the cone of light rays where the distribution of light is most uniform and the second system of condenser lenses being located between the first condenser lens system and the plane on which the projection is made, and said lens systems adjustable relative to each other and to the aperture.

FRANZ LISINTZKI.